US009481418B2

(12) United States Patent
Coutier

(10) Patent No.: US 9,481,418 B2
(45) Date of Patent: Nov. 1, 2016

(54) MOUNTING FRAME FOR A VEHICLE DOOR

(71) Applicant: COUTIER INDUSTRIE, Basse Ham (FR)

(72) Inventor: Charles Coutier, Cattenom (FR)

(73) Assignee: COUTIER INDUSTRIE, Basse-Ham (FR)

( * ) Notice: Subject to any disclaimer, the term of this patent is extended or adjusted under 35 U.S.C. 154(b) by 139 days.

(21) Appl. No.: 14/371,685

(22) PCT Filed: Jan. 11, 2013

(86) PCT No.: PCT/EP2013/050512
§ 371 (c)(1),
(2) Date: Jul. 10, 2014

(87) PCT Pub. No.: WO2013/104772
PCT Pub. Date: Jul. 18, 2013

(65) Prior Publication Data
US 2015/0082593 A1  Mar. 26, 2015

(30) Foreign Application Priority Data
Jan. 11, 2012  (FR) ..................... 12 50282

(51) Int. Cl.
B25B 27/14 (2006.01)
B62D 65/06 (2006.01)
B62D 65/02 (2006.01)

(52) U.S. Cl.
CPC .............. B62D 65/06 (2013.01); B25B 27/14 (2013.01); B62D 65/026 (2013.01); Y10T 29/53978 (2015.01)

(58) Field of Classification Search
USPC ....................................... 29/281.5
See application file for complete search history.

(56) References Cited

U.S. PATENT DOCUMENTS 4,342,535 A * 8/1982 Bartlett ............... B05B 13/0292
414/744.4
4,829,908 A * 5/1989 Hallam .................... B61D 7/28
105/240

(Continued)

FOREIGN PATENT DOCUMENTS

FR   2 854 862        11/2004
FR   2 937 611 A1     4/2010

Primary Examiner — Alvin Grant
(74) Attorney, Agent, or Firm — Muncy, Geissler, Olds & Lowe, P.C.

(57) ABSTRACT

A mounting jig for a vehicle door, the jig includes a first support having means for adjustably fastening it to a vehicle body in the vicinity of the door opening; a second support having fastening means for fastening to the vehicle door; connection arms for interconnecting the first and second supports, which arms are hinged to each of said supports, and their trace, in a plane perpendicular to the plane of the door opening, co-operates with the trace, in the same plane, of said supports, to form a deformable quadrilateral; a weight arm, mounted to move at least in translation along a vertical axis in guide means carried by the stationary support, between a low first position and at least one second position that is higher than said low position; at least one operating member for operating an indexing member for indexing the position of the second support relative to the first support, the operating member being connected to the weight shaft; and a raising lever, for acting against the effect of gravity, to raise the weight shaft from the first position towards the second position.

20 Claims, 5 Drawing Sheets

(56) References Cited

U.S. PATENT DOCUMENTS

| | | | | |
|---|---|---|---|---|
| 5,135,205 A * | 8/1992 | Bedard | ............... | B25H 1/0007 254/100 |
| 6,122,813 A * | 9/2000 | Roy | ...................... | B62D 65/06 29/281.1 |
| 6,430,835 B1 * | 8/2002 | Ranucci | ............... | B62D 65/06 33/600 |
| 2002/0170158 A1 * | 11/2002 | Savoy | ................... | B62D 65/06 29/404 |
| 2002/0170160 A1 * | 11/2002 | Savoy | ................... | B62D 65/06 29/407.1 |
| 2007/0204449 A1 * | 9/2007 | DuVernay | ............. | B62D 65/06 29/33.2 |
| 2008/0303307 A1 * | 12/2008 | Savoy | ...................... | B60J 5/04 296/146.11 |

\* cited by examiner

MOUNTING FRAME FOR A VEHICLE DOOR

The present invention relates to a jig for temporarily associating a vehicle door with the body of the vehicle, in particular on a vehicle body assembly and treatment line. The door is specifically a sliding door. The device may also be referred to as a "spacer".

In order to enable a vehicle body and its doors to be treated properly, e.g. in a cataphoresis bath, and to be painted, and in order to enable the door leaves and the body to be equipped with various accessories and sealants, it is appropriate to associate the body with its doors by means of a connection device that enables each door to move substantially parallel to itself (and to the opening in the body that is to receive it) and also enables each door to pivot about a substantially vertical hinge axis, so that it is possible to access either the inside of the body via the door opening, or the inside face of said door.

The body and the door must be positioned appropriately relative to each other, at least when the door is situated in the vicinity of the opening it is to close. This positioning accuracy is required in particular for reasons of distance to be kept between the surface to be painted and the paint gun, and also in order to control the "shadow" effects that are induced by moving the painted surfaces simultaneously relative to the spray direction of the paint.

BACKGROUND OF THE INVENTION

The devices or jigs that are in current use are formed by two frames that are hinged to each other by means of two intermediate connection rods or levers that co-operate with the two frames to form a hinged quadrilateral as seen from above.

One of the frames has means for fastening it to the body of the vehicle at the door opening. The other frame has means for supporting the door itself. In certain applications, those support means include a third frame that is hinged to the second frame and that actually supports the door.

Such mounting jigs are usually made up of machine-welded structural members having manufacturing tolerances that are large in order to keep cost price down. In particular, the pivots via which the frames are hinged together are of the door hinge type with hinge pins that co-operate with eyelets in hinge plates or straps. The accuracy with which such hinge portions are assembled by welding requires a considerable amount of slack to be arranged between the pin and the eyelet, that slack degrading the accuracy of the relative positioning of the frames and thus the accuracy of the relative positioning of the door panel and of the body. Unfortunately, such positioning needs to be accurate, at least when the frames are brought one against the other and the door is in the vicinity of its opening. In addition, that large amount of slack leaves a gap that fills with the substance with which the body is being treated (paint, stripper, etc.), which can lead to the pivots rapidly becoming clogged such that provision must be made for frequent cleaning, that requiring considerable action to be taken on the equipment.

In order to remedy those drawbacks, proposals have been made (see FR 2 854 862) for a vehicle door mounting jig that comprises a first frame having means for adjustably fastening it to a vehicle body in the vicinity of the door opening, a second frame having means for supporting the door of the vehicle on said second frame, and connection arms for connecting the first frame to the second frame, which arms are hinged to the first frame and to the second frame so as to cooperate with those frames to form a deformable quadrilateral in which the hinges between the arms and the frames are ball joints.

That configuration is entirely satisfactory in production, in particular since it has been the subject of an improvement described in FR 2 937 611 that makes it possible to calibrate each jig properly in a few minutes, i.e. to obtain rapidly the positions of the various ball joints so that the door panel is placed correctly relative to the body, mainly when the panel is brought into the vicinity of the door opening.

It has been found that it is not easy for an operator to maneuver the frame carrying the door relative to its support that is fastened to the vehicle, in particular because the painted door cannot be touched or because the operator is in an awkward position relative to the body, or because the body is immersed in a cataphoresis bath, etc.

OBJECT OF THE INVENTION

The invention proposes to make this apparatus simpler and more ergonomic to use for the operator situated on the vehicle production line.

BRIEF DESCRIPTION OF THE INVENTION

To this end, the invention thus provides a mounting jig for a vehicle door, the jig comprising:
- a first support having means for adjustably fastening it to a vehicle body in the vicinity of the door opening;
- a second support having fastening means for fastening to the vehicle door;
- connection arms for interconnecting the first and second supports, which arms are hinged to each of said supports, and their trace, in a plane perpendicular to the plane of the door opening, co-operates with the trace, in the same plane, of said supports, to form a deformable quadrilateral.

The jig further comprises:
- a weight arm, mounted to move at least in translation along a vertical axis in guide means carried by the stationary support, between a low first position and at least one second position that is higher than said low position;
- at least one operating member for operating an indexing member for indexing the position of the second support relative to the first support, the operating member being connected to the weight shaft; and
- a raising lever, for acting against the effect of gravity to raise the weight shaft from the first position towards the second position.

The system of the invention makes it possible to maneuver the door and to index its position simply and ergonomically. The only action of the operator consists in actuating a single lever for de-indexing the door and even optionally for moving it at least partially.

The guide means may include a ramp causing an upward movement to be transformed into a movement in rotation of the shaft about its vertical axis. The movement in rotation of said shaft causes a cam to bear, for example, on one of the connection arms (acting as an operating lever situated in the space swept by said cam) of the two supports and causes said arm to be driven so as to cause the two supports to start spacing the door apart from the body and from the door opening.

The fact that the weight shaft is a single shaft, thereby grouping together all of the means necessary for operating that mounting jig (for deploying it, for folding it up, and for its intermediate and end-of-stroke indexing), and the fact that its movement is vertical makes it possible for it to be provided at one of its ends with a float tending to act automatically to add weight to or to lighten the weight of the weight shaft when, for example, the body of the vehicle is immersed in a cataphoresis bath, when no operator can actuate the operating lever, and to do so as a function of the desired effect on operation of the apparatus.

The operating lever is secured to or integral with an indexing member for indexing the position of the second support relative to the first support.

For example, one of the possible indexing members is a hook that maintains the second support in the vicinity of the first support so that the door panel is situated in the opening in the body. Another of such possible indexing members is a second hook that maintains the second support in a position corresponding to the door panel being spaced apart to a maximum extent from the body. Yet another of such indexing members may be constituted by one of the structural members of the second frame, on which structural member a cam of the weight shaft comes to bear and to slide when said weight shaft moves in rotation so as to initiate spacing the door panel apart from the body and, as indicated above, so as to maintain said spacing by opposing return of the second frame onto the first frame.

The second frame may be urged to return onto the first frame by a resilient member disposed between the two supports. Advantageously, the invention makes provision for the hinges whereby the connection arms are hinged to the frames to be implemented by ball joints, thereby making it possible to place the hinge points three-dimensionally in such a manner that the effect of gravity generates the return force, over at least a range of the total movement of the second frame relative to the first frame.

Other characteristics and advantages of the invention appear from the following description of an embodiment of the invention.

BRIEF DESCRIPTION OF THE DRAWINGS

Reference is made to the accompanying drawings, in which.

DETAILED DESCRIPTION OF THE INVENTION

Figure 1:
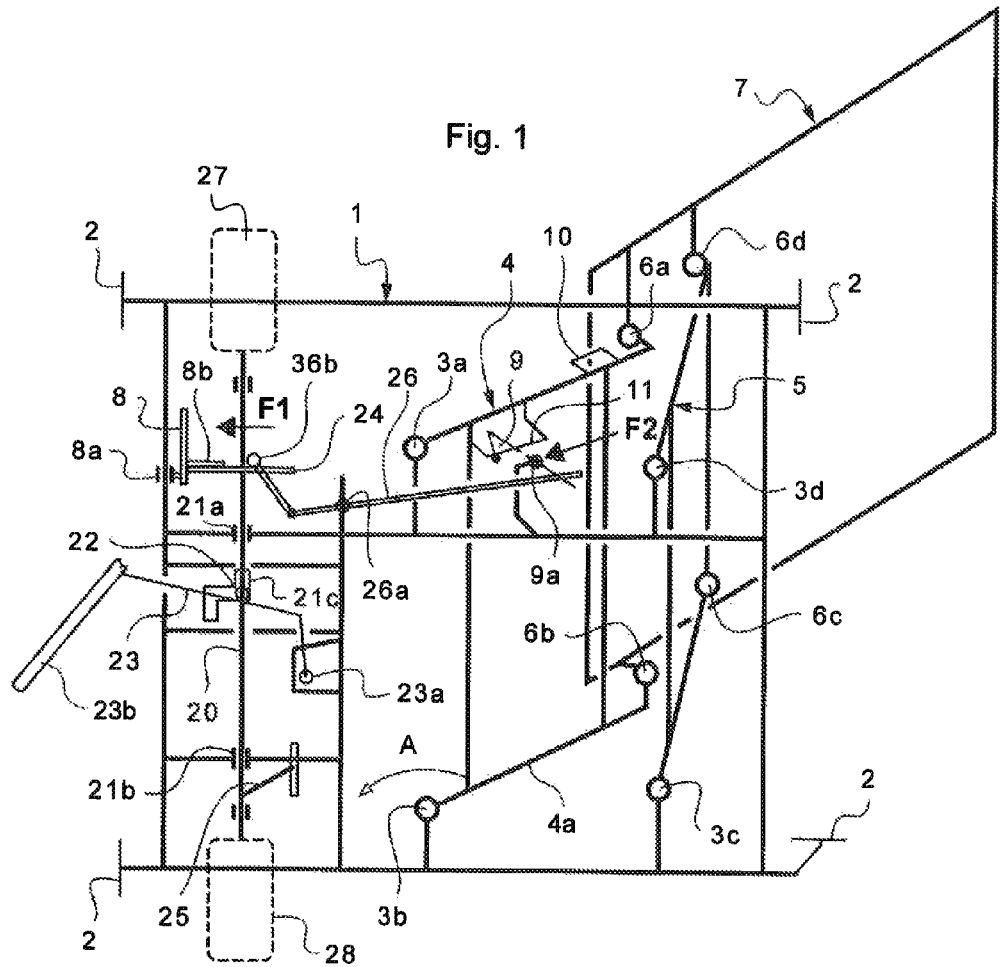
FIG. 1 is a diagram showing a first embodiment of a mounting jig of the invention.
Figure 2:
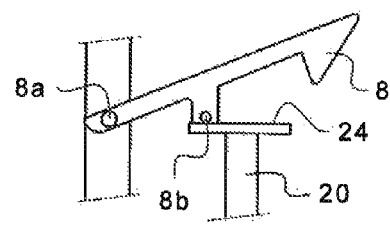
FIG. 2 is a diagram showing a detail of FIG. 1 seen looking along arrow F1.
Figure 3:
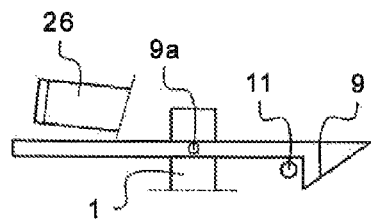
FIG. 3 is a diagram showing another detail of FIG. 1 seen looking along arrow F2.

FIGS. 1 to 3 that illustrate the following description of the first embodiment have been simplified intentionally for the purposes of explanation. In particular, numerous guide members for guiding the moving and hinged parts are not shown. In particular, the means for fastening to the body are shown in entirely diagrammatic manner.

As shown in FIG. 1, the mounting jig or "spacer" of the invention includes a first support in the form of a frame 1 that is designed to co-operate with the body of a vehicle. It is provided with means 2 for adjustably fastening it to said body (not shown) in the vicinity of the door opening. The frame 1 carries four ball joint elements 3a, 3b, 3c, and 3d, defining two axes as in the state of the art. Arms 4 and 5, also shown as frames, also carry ball joint elements that co-operate with the ball joint elements carried by the frame 1 to form the ball joints 3a, 3b, 3c, and 3d. Each of the arms also carries two ball joint elements 6a & 6b, and 6c & 6d, that also define axes of rotation for a support 7 in the form of a frame for the door panel (not shown). The frame 7 also has ball joint elements for co-operating with the ball joint elements of the arms to form the joints 6a, 6b, 6c, and 6d.

Each ball joint is known per se. It has a male element provided with a ball and mounted on a frame or on an arm. It also has a female element formed of a blind tubular endpiece or "socket" having an end wall that defines a hemispherical inside surface of the socket that is of the same diameter as the ball that is also mounted on a frame or on an arm.

Seen from above, the mounting jig (the spacer), with its supports and its arms, forms a deformable quadrilateral. One of the limit configurations of this quadrilateral is the one corresponding to FIG. 1, in which the spacer is in its maximum deployment state. If, starting from this state, the spacer is folded up, e.g. by moving the arm 4 in the direction indicated by arrow A, the frame 7 is brought in a toggling movement onto the frame 1, corresponding to the position of the door panel received in the opening in the body.

A hook 8 co-operates in holding the spacer in this folded-up position; a hook 9 co-operates in holding the spacer in its deployed position. These hooks are carried by the stationary support 1. They are hinged as shown in FIGS. 2 and 3, i.e. about pivots 8a and 9a, and they tend to turn downwards about said pivots. Hookable loops 10 and 11 equip the arms 4 and find themselves facing the hooks so as to be hooked by them in the respective above-mentioned states (in FIGS. 1 to 3, the hook 9 is engaged in the loop 11). The hooks and loops engage automatically with one another. The hooks are disengaged as explained below.

The stationary support 1 has a cam-carrying shaft 20 that is mounted to slide in vertical guide means 21a, 21b, and 21c. The elements 21a and 21b are slideways, while the guide element 21c is a slot provided in a plate of the frame 1 that constrains the shaft 20 to keep within its path and its limits. In the example shown, this slot is in the form of a broken opening, with two vertical end segments, and a connecting central segment that is substantially horizontal or slightly inclined in the form of a ramp. It is recalled that the central portion is optional and does not need to be provided if the application of the invention does not require the shaft 20 to move in rotation. A radial finger 22 that is secured to or integral with the shaft 20 passes into this slot and can be intercepted by a lever 23 for raising the shaft 20, which lever is hinged to the frame about one end 23a, and has an operating handle 23b at its other end. It can be understood that when the lever 23 is down and when the finger 22 is in abutment in the bottom portion of the slot 21c, the shaft is in its low position. By raising the lever 23, the finger 22 is forced to raise the slot 21c, and thus the shaft 20 is raised. Continuing to raise the lever causes the finger 22 to travel over the horizontal middle portion of the slot 21c, thereby causing the shaft 20 to move in rotation about its axis. Continuing to raise the lever causes the shaft 20 to be raised to an additional extent.

The upper portion of the shaft is provided with a tray 24 that is a cam which, while the shaft 20 is rising, meets a finger 8b carried by the hook 8. Thus, during the first portion of the ascension of the shaft 20, the hook 8 is raised by the tray 24 and the spacer is unlocked if it was in its folded-up state. It is thus possible to space the door panel apart from the body. In order no assist in this first spacing-apart stage, the lower portion of the shaft 20 has a second cam 25 that turns with the shaft as the actuation of the lever 23 by an operator continues. This cam 25 then bears slidingly on a bottom structural member 4a of the arm 4 (which is assumed to be folded onto the support 1), thereby forcing a movement in rotation for deploying the spacer. The operator can then more easily continue the deployment operation by acting directly on the apparatus that is already partway open. It is thus possible to reach full deployment of the spacer up until the hook 9 engages in the corresponding loop 11. It is also possible to fasten the spacer in an intermediate position if other latches are provided for that purpose.

It should also be noted that a lever 26 hinged at 26a to the support 1 is present, one end of which lever has a finger 26b bearing continuously on the tray 24 of the shaft 20. The other end of this lever 26 is suitable for bearing against the tail of the hook 9 so as to disengage it from the loop 11. This takes place when the operator raises the lever 23 and this the tray 24 even further, thereby forcing the end of the lever 26 towards and into contact with the tail of the hook 9 so as to cause it to pivot in the direction of disengagement from the loop 11. It is thus possible for an operator who is distant from the hook 9 to operate it from the operator's work position that is generally adjacent to the handle 23b of the lever 23.

Finally in FIG. 1, floats 27, 28 are shown that can (optionally) be connected to the shaft 20 that constitutes a weight shaft. These floats are preferably connected to the shaft 20 by means of levers (not shown) that are suitable for transforming the force resulting from the buoyancy into a force added to the effect of gravity on the shaft 20 in such a manner as to oppose it being raised in untimely manner in a bath of liquid. FIG. 1 shows two floats, one at the top of the shaft and one at the bottom of the shaft, which floats act directly on the shaft 20 to drive the shaft upwards, and therefore, if necessary, to unlock the device instead of or in addition to the raising lever. This duplication makes it possible to distribute and to adjust the float volumes easily as a function of the desired results.

Finally, an advantageous feature of the invention that lies in the ball joints should be noted. It is possible to provide simple means for adjusting the three-dimensional positions of the hinge points, in particular relative to the direction of the gravity field, and thus to generate an imbalance in the device loaded with a door panel, which imbalance tends either to deploy the spacer or, in more practical manner, to fold it up. For example, these means may be brackets that carry joint balls that are adjustable in the height direction and that have positions adjustable in a horizontal plane on baseplates provided on the appropriate elements of the frame. It can be understood that, for example, it is easy to ensure that the door is held in a position in which it is spaced apart to small extent from the body, which position is set by the cam 25 on which the door is constrained to bear under the effect of the imbalance tending to fold up the mechanism. There is then no longer any need for an intermediate hook for indexing this position. The existence of this gravitational return torque also offers the advantage of guaranteeing passively that the door is as close as possible to the body, thereby limiting the risk of it being torn off in the event that the treatment line malfunctions.

Elements that are identical or analogous to above-described elements bear the same numerical reference in the following description of the second and third embodiments of the invention, given with reference to FIGS. 4 to 9.

As above, in the second and third embodiments, the mounting jig comprises a stationary support 1, means 2 for fastening the frame 1 to the body, ball joint elements 3, arms 4 and 5, ball joint elements 6, and a frame 7.

In the second and third embodiments, the stationary support 1 includes two reinforcements 1.1. and 1.2 that are substantially plane and that define a V-shape as seen from above. A vertical edge of an intermediate frame 52 is mounted to pivot on the reinforcement 1.1 via ball joints 51, on which frame the arms 4 and 5 are mounted to pivot via the ball joints 3. Seen from above, the frames 52 and 7 co-operate with the arms 4, 5 to form a deformable quadrilateral. A vertically extending locking finger 53 is fastened in such a manner that it projects laterally from the intermediate frame 52.

In addition, the arm 4 is connected to the reinforcement 1.1 via a link 54 in such a manner that the intermediate frame 52 pivoting relative to the reinforcement 1.1 causes the arm 4 to pivot (and therefore the arm 5 to pivot via the frame 7) relative to the intermediate frame 52. The ends of the links 54 are connected to the reinforcement 1.1 and to the arm 4 via ball joints. The link 54 constitutes means for synchronizing the pivoting of the arm 4 with the pivoting of the intermediate frame 52 relative to the first reinforcement 1.1.

The stationary support 1 has a cam-carrying weight shaft 20 that is mounted to slide in vertical guide means 21a, 21b of the reinforcement 1.2. The upper portion of the shaft 20 is provided with a locking control tray 55 that is constrained to move in translation with the shaft 20 and that is provided in a V-shaped recess 56 for receiving the locking finger 55 when the intermediate frame 52 is brought against the reinforcement 1.2.

A lever 23 has one end 23a that is hinged to the reinforcement 1.2 and an opposite end that is provided with a handle 23b.

In the second embodiment (FIGS. 4 to 7), the lever 23 has a central portion that is provided with a substantially vertical oblong groove 23c receiving a radial finger 22 that is secured to or integral with the shaft. The central portion of the lever 23 is also connected via a link 57 to a cam 24 that is mounted to slide on the shaft 20 and to pivot on the reinforcement 1.2 in such a manner that the cam 24 acts on the intermediate frame 52 to initiate a pivoting movement of the intermediate frame 52 and thus of the arms 4, 5, resulting in the frame 7 being caused to start deploying. The ends of the links 57 are connected to the lever 23 and to the cam 24 via hall joints. The cam 24 is constrained in rotation with the tray 55 but is free to move in translation relative thereto.

Figure 4:
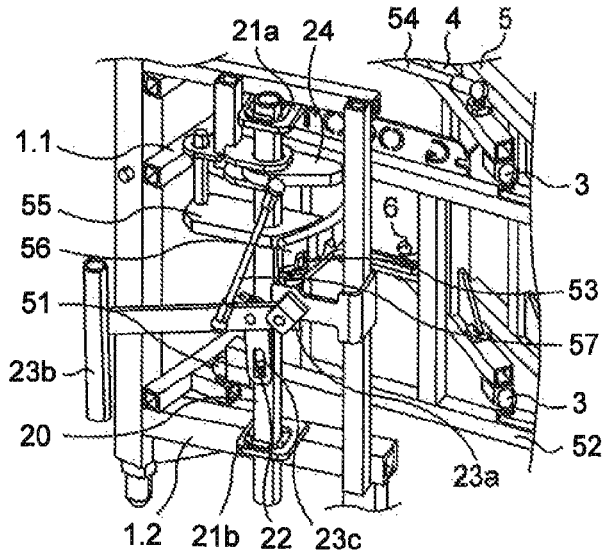
FIGS. 4 to 6 are perspective views of a second embodiment of a mounting jig of the invention, respectively in the closed position, in the semi-open position, and in the open position.
Figure 5:
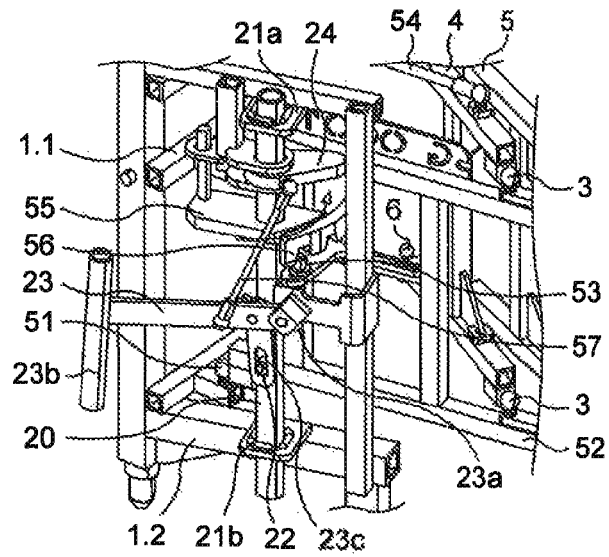
Figure 6:
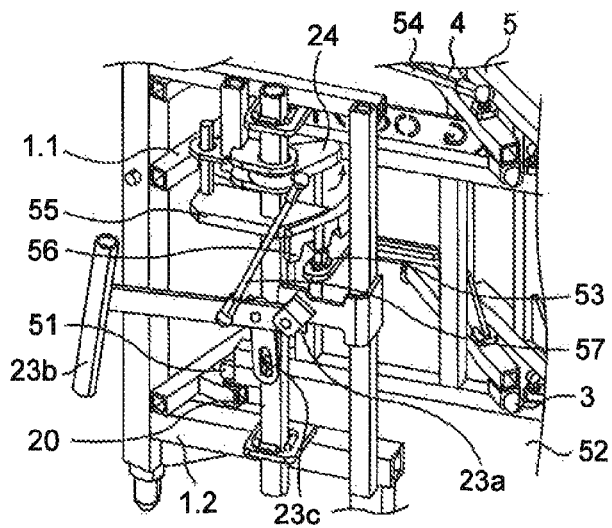
Figure 7:
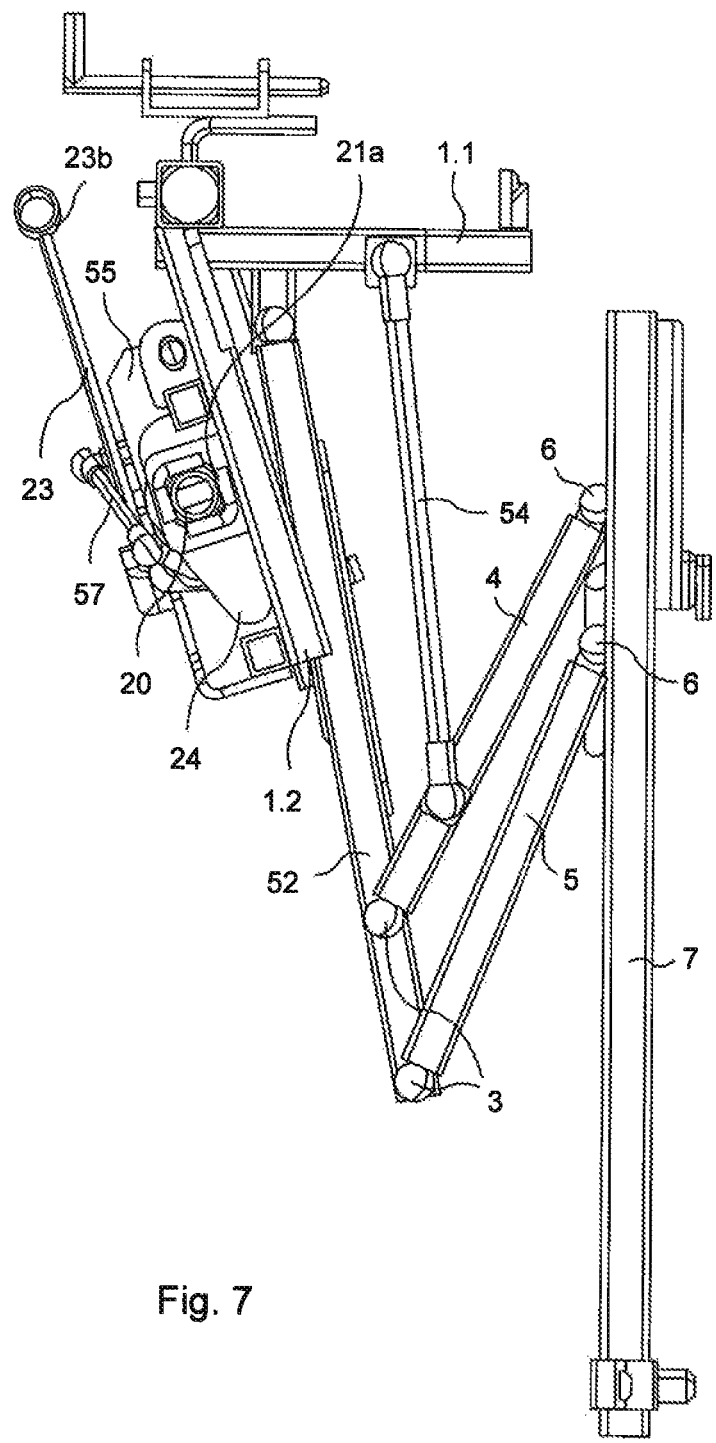
FIG. 7 is a view from above of this mounting jig.
Figure 8:
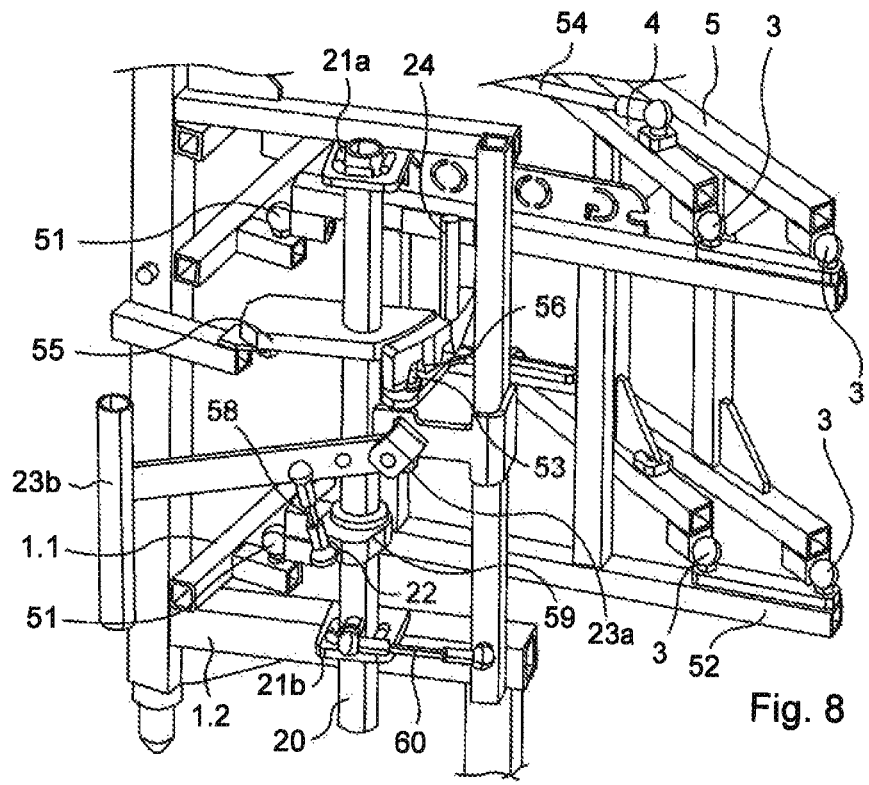
FIGS. 8 and 9 are perspective views of a third embodiment of a mounting jig of the invention, respectively in the closed position, and in the semi-open position.

It can be understood that when the lever 23 is down and the finger 22 is in abutment in the bottom portion of the groove 23c, the shaft 20 is in its low position (FIGS. 4 and 7). By raising the lever 23, the finger 22 is forced to rise so that the shaft 20 is raised, and the tray 55 is raised, thereby progressively disengaging the locking finger 53 from the recess 56 (FIG. 5). Simultaneously (or, in a variant, with a phase shift), the link 57 causes the cam 24 to move in rotation, and therefore causes the tray 55 to move in rotation. Continuing to raise the lever 23 causes the cam 24 to be pressed into abutment against the intermediate frame 52, causing the spacer to deploy (FIG. 6).

In the third embodiment (FIGS. 3 and 9), the lever 23 has a central portion connected via a link 58 to a radial finger 22 secured to or integral with a ring 59 that is constrained to move in translation with the shaft 20 but that is free to move in rotation relative thereto. The ends of the link 58 are connected to the finger 22 and to the lever 23 via ball joints.

The lever 23 has a bottom end that is connected to the reinforcement 1.2 via a link 60 having its ends provided with ball joints. The link 60 makes it possible to drive the shaft 20 in rotation when the shaft 20 is moved vertically.

The tray 55 is constrained in rotation and in translation with the shaft 20, and carries a cam 24 in an off-center position in such a manner that the cam 24 acts on the intermediate frame 52 to initiate a pivoting movement of the intermediate frame 52 and thus of the arms 4, 5, resulting in the frame 7 starting to deploy. A locking finger 61 extends in a manner such that it projects under the tray 55 in a position that is off-center relative to the shaft 20.

Figure 9:
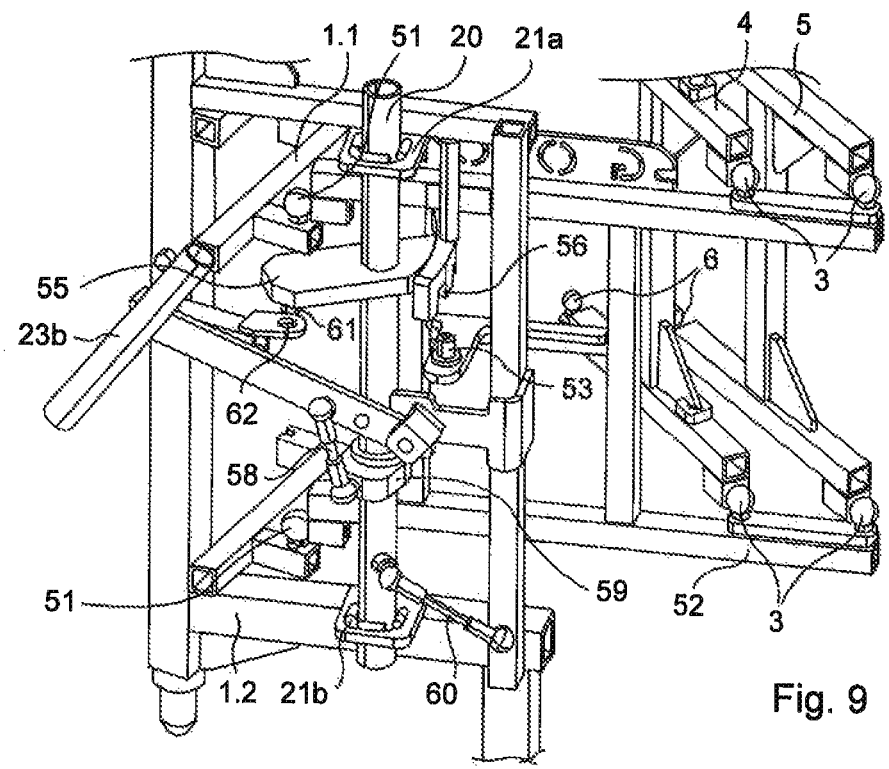

It can be understood that when the lever 23 is down, the shaft 20 is in its low position (FIG. 8) and the locking finger 61 is received in a recess 62 that is integral with the stationary support 1 so as to prevent the shaft 20 from moving in rotation. By raising the lever 23, the finger 22 is forced to rise so that the shaft 20 is raised, and the tray 55 is raised, thereby progressively disengaging the locking finger 53 from the recess 56 and disengaging the locking finger 61 from the recess 62. Simultaneously, the link 60 causes the tray 55 to move in rotation, and thus causes the cam 24 to move. Continuing to raise the lever 23 causes the cam 24 to be pressed into abutment against the intermediate frame 52, causing the spacer to deploy (FIG. 9).

Figure 10:
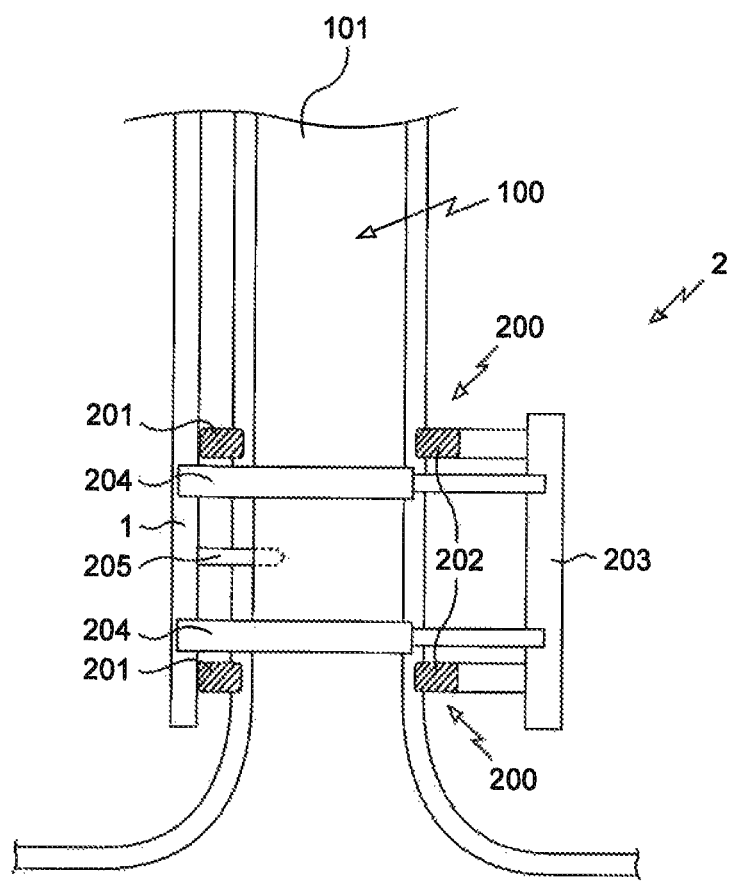
FIG. 10 is a diagrammatic elevation view of the fastening means for fastening the mounting jig in the body.
Figure 11:
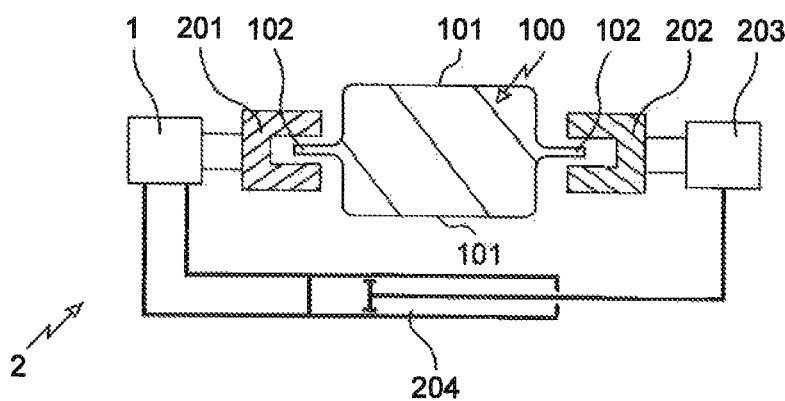
FIG. 11 is a plan view of these fastening means.

FIGS. 10 and 11 show an embodiment of the fastening means for fastening the mounting jig to a vehicle body having a central upright given overall reference 100 and extending between the front and rear doors. In this example, the central upright 100 is made up of two stamped metal sheets 101 united by crimping and/or welding their edges 102.

The fastening means, given overall reference 2, comprise two clamps 200, spaced apart from each other in the vertical direction, each clamp having a first jaw 201 to which the stationary support 1 is fastened and a second jaw 202 that is fastened to the first jaw 201 via means for adjusting spacing between the jaws, which means are clamping means in this example. The two jaws 202 are secured to the same plate 203 that is connected via actuators 204 to the stationary support 1 in such a manner as to be capable of clamping a portion of the central upright 100 between the jaws 201, 202. By way of a variant, the actuators 204 are replaced with quick clamping means of the toggle type or of some similar type. By way of a variant, the clamping means maintain a predetermined spacing of not less than the width of the upright 100 between the jaws.

The jaws 201, 202 are C-shaped jaws, each defining a respective recess for receiving one of the edges 102.

The upright 100 may have relief with which the fastening means co-operate to position the support 1 in the height direction.

For example, in the absence of such relief, the stationary support 1 is advantageously provided with a stud 205 designed to be engaged in a recess provided in the central upright 100 for indexing the clamps 200 in the height direction along the upright 100. The mounting jig may have retraction means making it possible to move the stud 205 between a not-in-use retracted position and an in-use projecting position. The mounting jig may have means for moving the pin 205 and/or means for adjusting the pin 205 in the height direction.

Naturally, the invention is not limited to the described embodiments but rather it encompasses any variant, lying within the scope of the definition of the invention appearing in the claims.

In particular, the invention may have a simpler form in which, for example, the cam-carrying shaft does not move in rotation to any extent.

The fastening means may have a structure that is different from the structures described and/or shown.

Although the second support is shown in the form of a frame 7, the supports may be formed by a single element or by a plurality of reinforcements that are secured together.

One of the arms 4 and 5 may have only one hinge to the stationary support 1 and/or only one hinge to the frame 7. The arms 4 or 5 may thus be in the form of links.

A third support, e.g. a deployable support, may be fastened to the second support to be movable relative thereto.

The weigh shaft may be operated by a lever fastened permanently to the mounting jig, or by a lever that is removable and that can be fitted thereto. In particular when the lever is removable, it can be inserted into the body so as to engage with the weigh shaft by passing the removable lever through the window opening provided in the door, through the hole provided in the door for receiving the lock, or through any space existing between the door and the body when the door is supported by the spacer. The removable lever is arranged to: act directly on the weight shaft instead of the lever 23 (said removable lever then includes means for engaging it with the weight shaft); act on an intermediate lever, e.g. of the fork type that is distinct from the lever 23; or act directly or indirectly on the lever 23 (said removable lever then, for example, including means for engaging it with the lever 23). This makes it possible to open the door from the outside of the body without touching the door, which is advantageous, in particular when the door has just been painted.

The mounting jig may also be associated with means for closing the door from the outside of the body, e.g. a rod inserted through the lock-receiving hole in the door for enabling an operator to handle the door without touching it directly.

The invention claimed is:

1. A mounting jig for a vehicle door, the jig comprising at least:
   a first support, wherein said first support is a stationary support having means for adjustably fastening to a vehicle body in a vicinity of a door opening;
   a second support having fastening means for fastening to the vehicle door;
   connection arms for interconnecting the first and second supports, which arms are hinged to each of said supports, and a trace of said connection arms, in a plane perpendicular to a plane of the door opening, co-operates with the trace in a same plane of said supports, to form a deformable quadrilateral;
   said mounting jig being characterized in that the jig further comprises:
   a weight shaft, mounted to move at least in translation along a vertical axis in guide means carried by the stationary support, between a low first position and at least one second position that is higher than said low position;
   at least one operating member for operating an indexing member for indexing the position of the second support relative to the stationary support, the operating member being connected to the weight shaft; and a raising lever, for acting against an effect of gravity, to raise the weight shaft from the low first position towards the second position.

2. The jig according to claim 1, wherein the operating member comprises at least one radial cam, connected to the weight shaft, and that sweeps through a space around the weight shaft, in which space at least one operating lever for operating the indexing member extends.

3. The jig according to claim 2, wherein said guide means include means for forcing the weight shaft to move in rotation, which means include a cam suitable for bearing against one of the connection arms (acting as an operating lever situated in the space swept by said cam) that interconnect the two supports so as to cause the two supports to start being spaced apart and so as to cause the door to move away from the body.

4. The jig according to claim 1, wherein the weight shaft has an end provided with a float, wherein said float tends to move the weight shaft upwards when the body of the vehicle is immersed in a treatment bath.

5. The jig according to claim 2, wherein each operating lever is secured to or integral with an indexing lever for indexing the position of the second support relative to the first support.

6. The jig according to claim 5, wherein one of said members is a hook that maintains the second support in a vicinity of the first support so that the vehicle door is situated in the door opening of the vehicle body.

7. The jig according to claim 5, wherein another of said members is a second hook that maintains the second support in a position corresponding to the vehicle door being spaced apart to a maximum extent from the vehicle body.

8. The jig according to claim 5, wherein a third member is constituted by one of structural members of the arm, on which member a cam that is secured to or integral with the weight shaft comes to bear and slide while said shaft is moving in rotation so as to initiate spacing the vehicle door apart from the vehicle body.

9. The jig according to claim 1, wherein the connection arms are hinged to the supports by hinges implemented by ball joints, making it possible to place the hinge points three-dimensionally in such a manner that the effect of gravity generates a return force, over at least some range of the total movement of the second support relative to the first support.

10. The jig according to claim 1, wherein the stationary support has first and second reinforcements and that are substantially plane and that define a dihedral, a vertical edge of an intermediate frame on which the arms are mounted to pivot on the first reinforcement, one of the arms also being connected to the first reinforcement via means for synchronizing the pivoting of the arm with the pivoting of the intermediate frame relative to the first reinforcement.

11. The jig according to claim 10, wherein an upper portion of the weight shaft is provided with a locking control tray that is constrained to move in translation with the shaft and that is provided with a V-shaped recess for receiving a locking finger secured to or integral with the intermediate frame when said intermediate frame is brought against the reinforcement.

12. The jig according to claim 11, wherein the lever is connected via a link to the cam mounted to slide on the shaft and to pivot on the stationary support and to act on the intermediate frame, the cam being constrained in rotation with the tray but being free to move in translation relative thereto.

13. A jig according to claim 12, wherein the lever is connected by a link to a radial finger that is secured to or integral with a ring that is constrained in translation with the weight shaft but that is free to move in rotation relative thereto, and the lever has a bottom end connected to the reinforcement via a link for driving the weight shaft in rotation when the weight shaft is moved vertically, the tray being constrained in rotation and in translation with the weight shaft, and carries the cam in an off-center position in such a manner that the cam acts on the intermediate frame.

14. The jig according to claim 13, wherein a locking finger extends in a manner such that it projects under the tray in an off-center position relative to the weight shaft so as to be received in a recess in the stationary support when the intermediate frame is brought against the stationary support.

15. The jig according to claim 1, wherein the fastening means comprise at least one clamp, each of which comprises a first jaw to which the stationary support is fastened and a second jaw that is fastened to the first jaw in such a manner as to clamp a portion of a central upright of the body between the jaws.

16. The jig according to claim 1, wherein the second jaw has an end hinged to an end of the first jaw, and an opposite end fastened to an opposite end of the first jaw by means for adjusting a spacing between the jaws.

17. The jig according to claim 16, wherein the jaws form a recess for receiving an edge of the central upright.

18. The jig according to claim 16, wherein at least one of the jaws is provided with at least one stud designed to be engaged in a recess provided in the central upright so as to index said jaw in the height direction along the upright.

19. The jig according to claim 1, wherein the lever is removable and suitable for being fitted to the jig by being inserted into the body through a window opening provided in the vehicle door, or through a hole provided in the vehicle door for receiving the lock, or through any space existing between the vehicle door and the vehicle body when the vehicle door is supported by the jig.

20. The jig according to claim 1, wherein the lever is arranged to act either directly or indirectly on the weight shaft.

* * * * *